M. HANDSCHIEGL.
CINEMATOGRAPHIC FILM COLORING MACHINE.
APPLICATION FILED APR. 30, 1918.

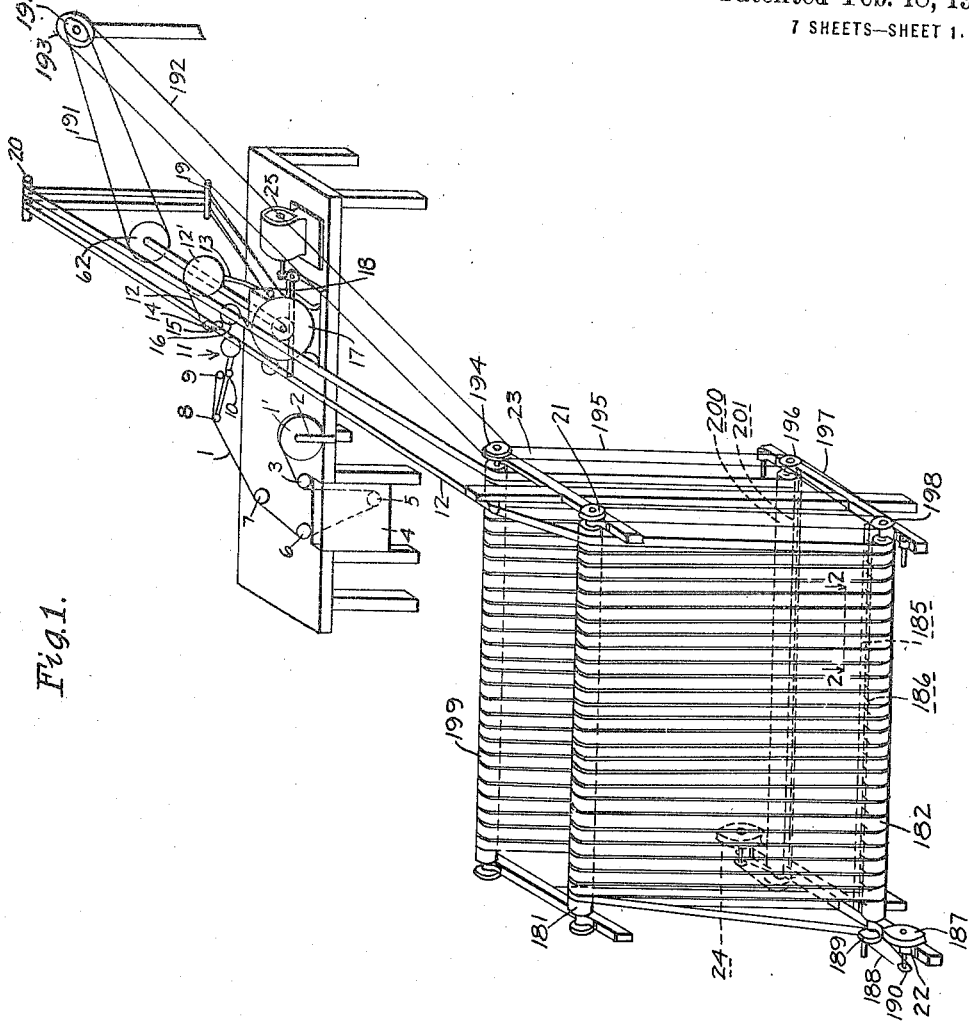

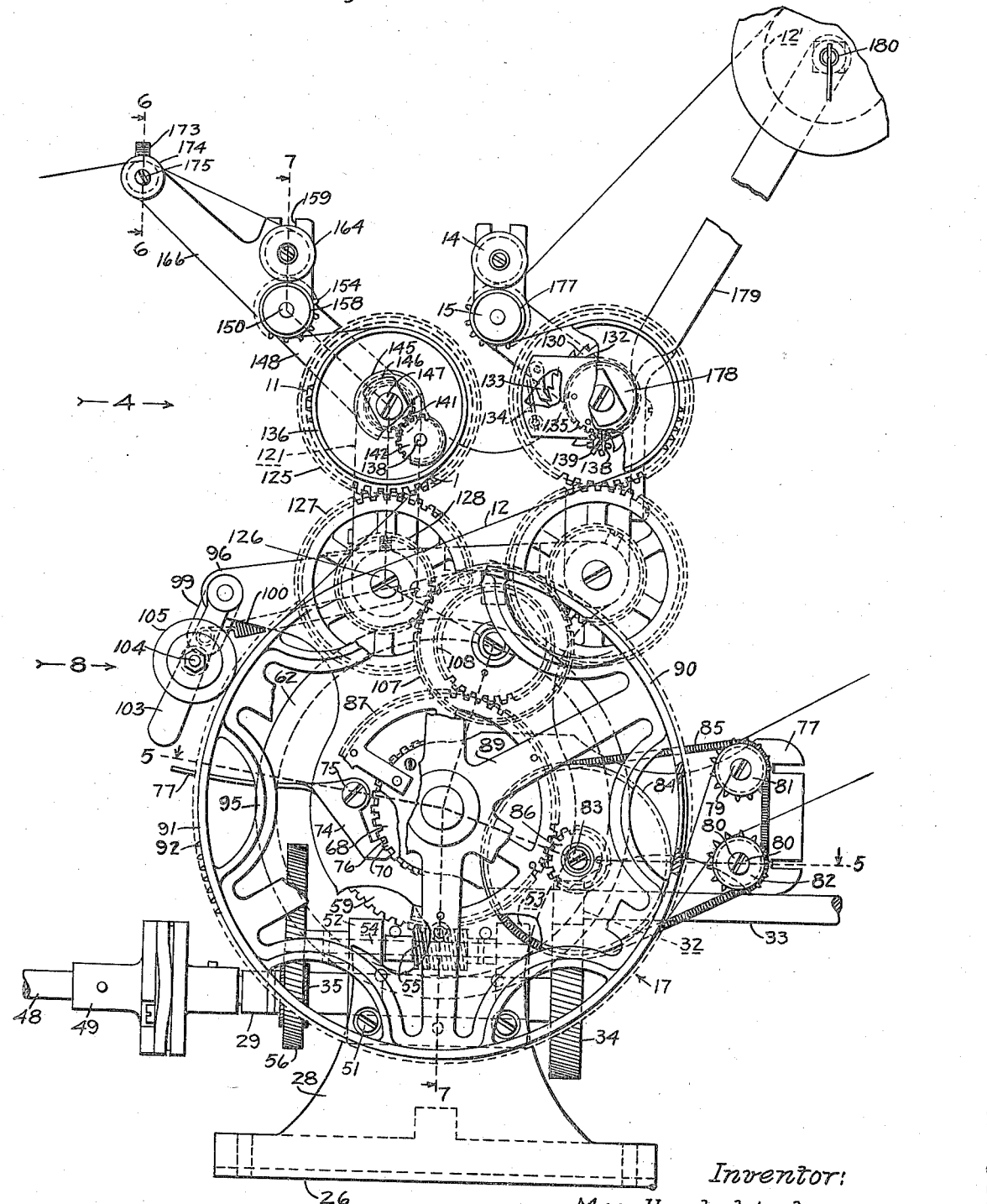

1,295,028.

Patented Feb. 18, 1919.
7 SHEETS—SHEET 3.

Inventor:
Max Handschiegl,
by Hazard and Miller
Att'ys.

M. HANDSCHIEGL.
CINEMATOGRAPHIC FILM COLORING MACHINE.
APPLICATION FILED APR. 30, 1918.

1,295,028.

Patented Feb. 18, 1919.
7 SHEETS—SHEET 4.

Inventor:
Max Handschiegl,
by Hazard & Miller
Att'ys.

M. HANDSCHIEGL.
CINEMATOGRAPHIC FILM COLORING MACHINE.
APPLICATION FILED APR. 30, 1918.

1,295,028.

Patented Feb. 18, 1919.
7 SHEETS—SHEET 5.

Inventor:
Max Handschiegl,
by Hazard and Miller
Attys.

M. HANDSCHIEGL.
CINEMATOGRAPHIC FILM COLORING MACHINE.
APPLICATION FILED APR. 30, 1918.

1,295,028.

Patented Feb. 18, 1919.
7 SHEETS—SHEET 6.

Inventor:
Max Handschiegl,
by Hazard & Miller
Att'ys.

M. HANDSCHIEGL.
CINEMATOGRAPHIC FILM COLORING MACHINE.
APPLICATION FILED APR. 30, 1918.

1,295,028.

Patented Feb. 18, 1919.
7 SHEETS—SHEET 7.

Inventor:
Max Handschiegl,
by Hazard and Miller
Att'ys.

UNITED STATES PATENT OFFICE.

MAX HANDSCHIEGL, OF LOS ANGELES, CALIFORNIA.

CINEMATOGRAPHIC-FILM-COLORING MACHINE.

1,295,028.   Specification of Letters Patent.   Patented Feb. 18, 1919.

Application filed April 30, 1918. Serial No. 231,713.

*To all whom it may concern:*

Be it known that I, MAX HANDSCHIEGL, a citizen of the United States, residing at Los Angeles, in the county of Los Angeles and State of California, have invented new and useful Improvements in Cinematographic-Film-Coloring Machines, of which the following is a specification.

My invention relates to a machine for making colored moving picture films.

In my co-pending application for a process of producing colored moving picture films, Serial No. 227580, filed April 9, 1918, I have described a process for producing a colored moving picture film in which the views photographed are represented in their natural colors. The process in brief is as follows:

A pair of negatives is taken simultaneously of the same view by a single operation of a shutter and through a pair of complementary color screens. A positive is prepared of all the views taken through one of said screens and arranged in chronological order of exposure. This positive is dye-toned with a dye having a color which is complementary to the color of the screen through which the negative from which the positive is prepared was taken. A negative is prepared of the views taken through the other colored screen, said views being likewise arranged in chronological order of their exposure. A transfer dye is now applied to the negative which will absorb said dye in proportion to the light parts of the negatives; that is to say, those parts containing little or no silver. The color of the transfer dye applied to the negative is complementary to the dye in which the positive was treated or dye-toned. The positive is now immersed in a solution to soften the gelatinous coating thereon in order to render the same capable of absorbing the transfer dye of the negative. The dye-toned positive and the transfer dye negative are now caused to pass through an apparatus which moves them in contact face to face and in perfect registry so that the views on the positive will be coincident with the views on the negative, each contacting pair of which was taken by the same exposure and operation of the shutter of the camera. The positive and negative films are held face to face under pressure for a variable length of time whereby the desired quantity of transfer dye is absorbed by the positive. The positive film and the negative film are separately wound the positive being passed through a drying mechanism.

It is an object of my present invention to provide a machine for taking the dye-toned positive just referred to and the corresponding negative to which the transfer dye has been applied and to effect the transfer of the dye from the negative to the positive to produce a finished colored positive exhibition film.

Specifically my object is to make such a machine which will take the dye-toned or a bleached positive film; pass the film through a solution to soften the film; take the softened film around an impression drum in contact with a negative film carrying the transfer dye; adjust the positive film and the negative film to produce perfect registration upon each other; adjust the period of contact and the force of the impression between the positive film and the negative film to regulate the transfer of coloring matter; pass the positive film from the impression drum over a continuous drier, rewind the dried colored positive film, pass the negative film from the impression drum over a continuous drier, and rewind the dried negative film.

Figure 1 is a diagrammatic perspective illustrating the operation of producing dried colored films in accordance with the principles of my invention.

Fig. 2 is a sectional detail on the line 2—2 of Fig. 1.

Fig. 3 is a side elevation of the registering and impressing mechanism as seen looking in the direction indicated by the arrow 3 in Fig. 4.

Figure 4:
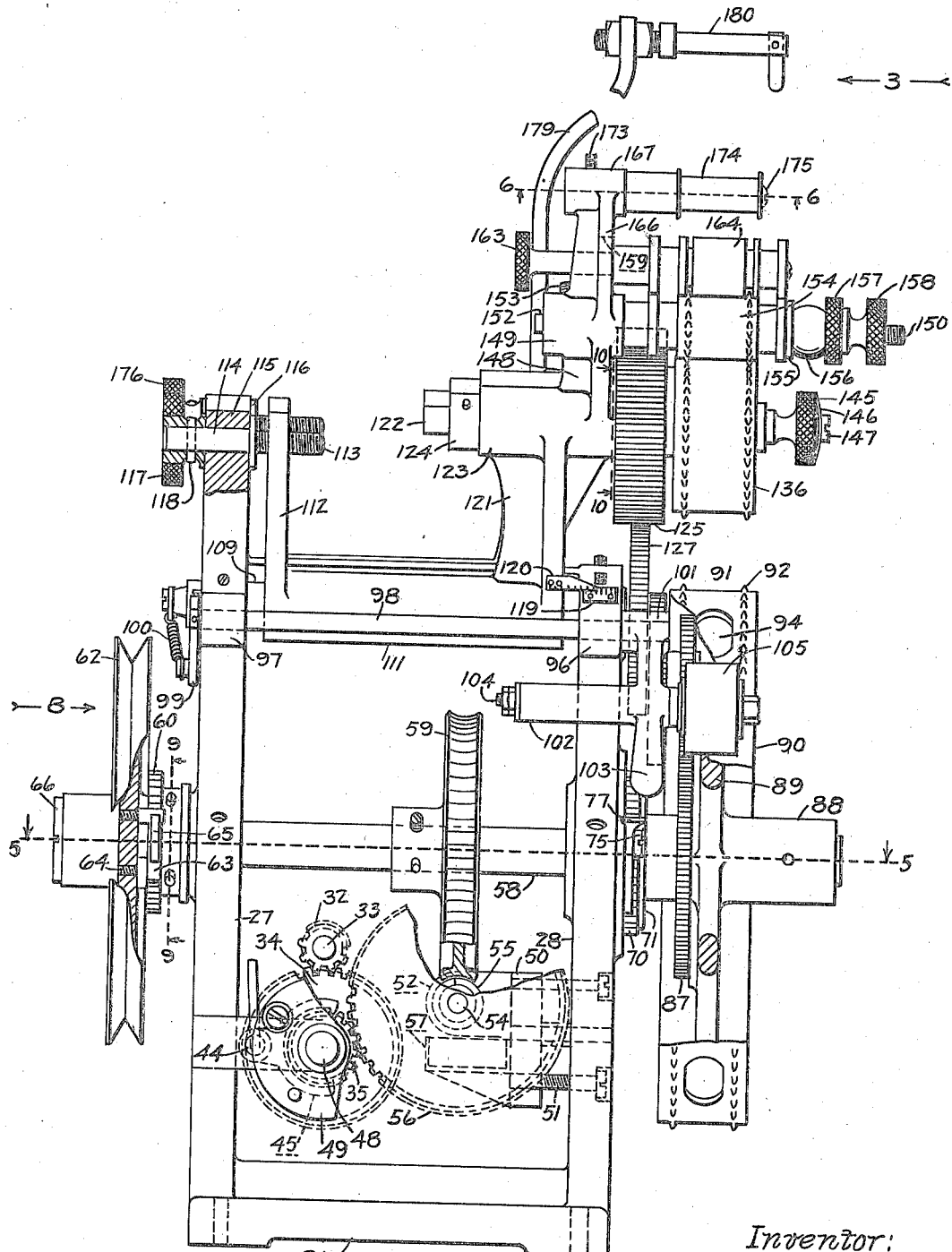
Fig. 4 is a detailed front elevation as seen looking in the direction indicated by the arrow 4 in Fig. 3.
Figure 5:
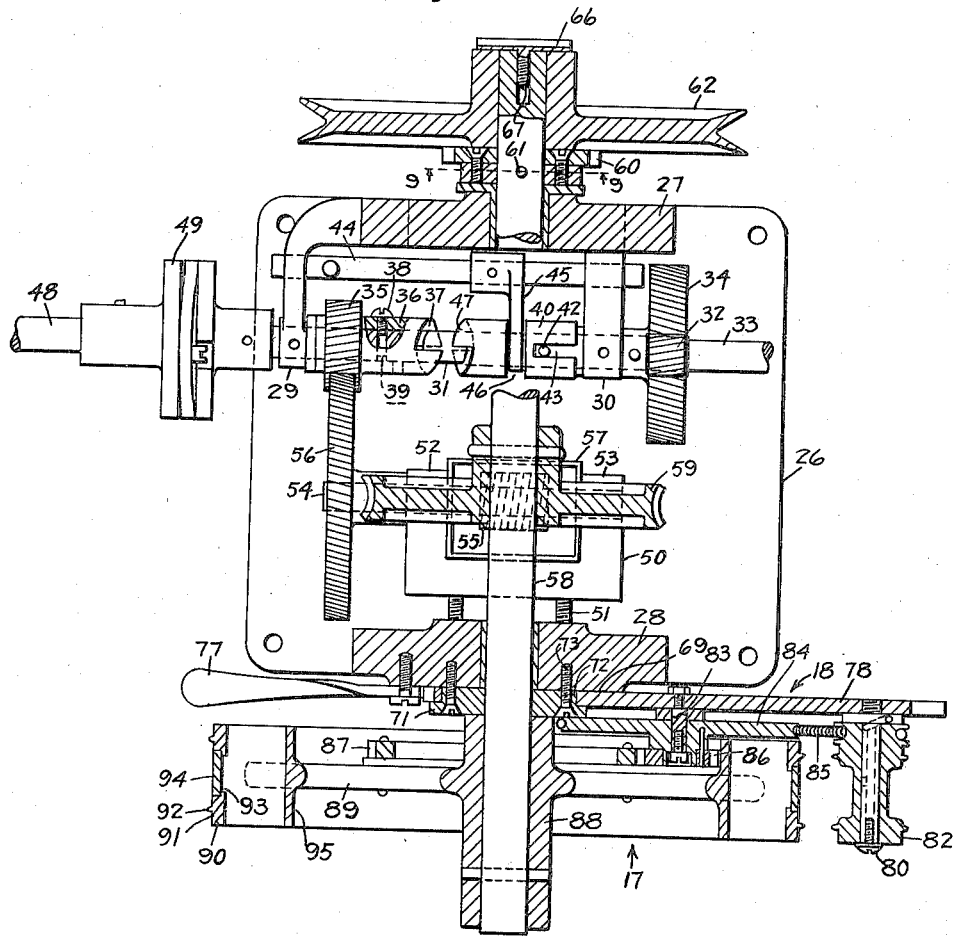
Fig. 5 is a horizontal section on the lines 5—5 of Figs. 3 and 4.
Figure 6:
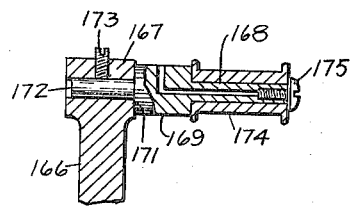
Fig. 6 is a sectional detail on the lines 6—6 of Figs. 3 and 4.
Figure 7:
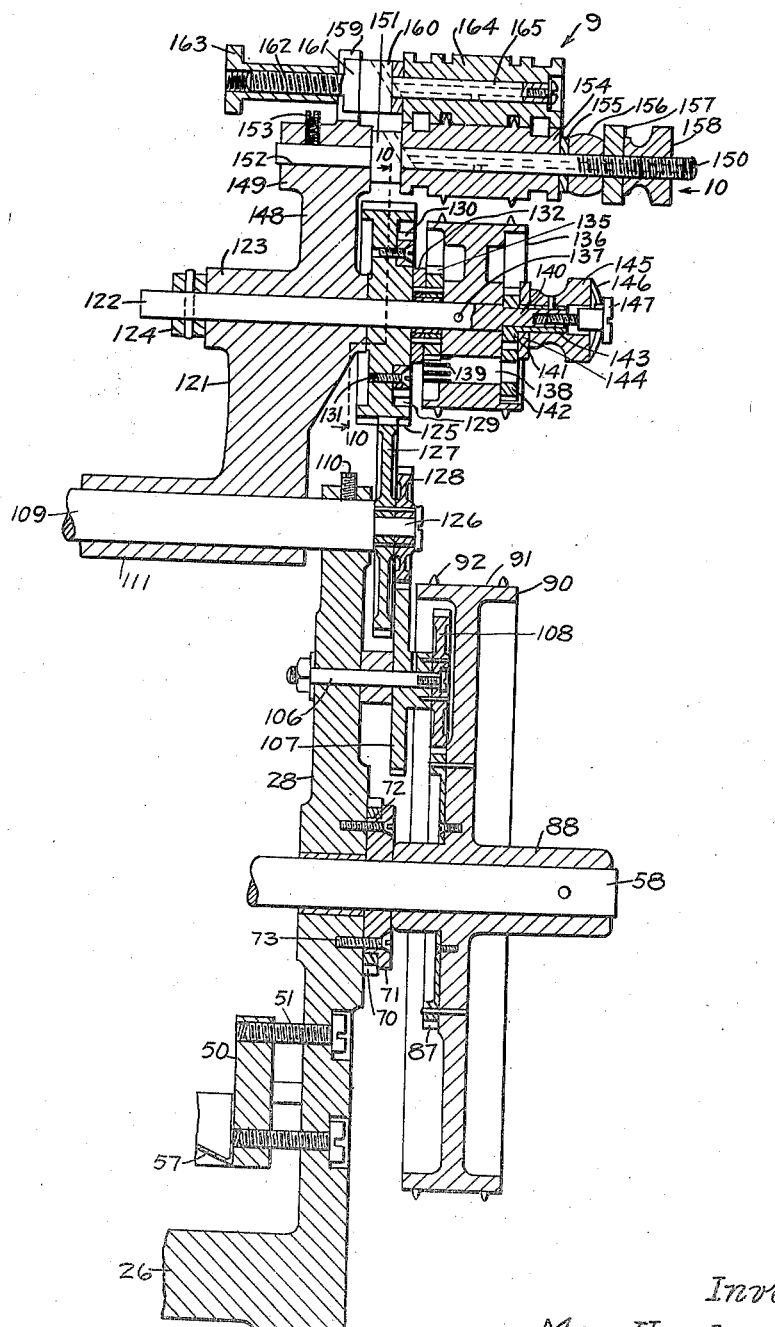
Fig. 7 is a vertical sectional elevation on a plane parallel with Fig. 4 and on the line 7—7 of Fig. 3.
Figure 8:
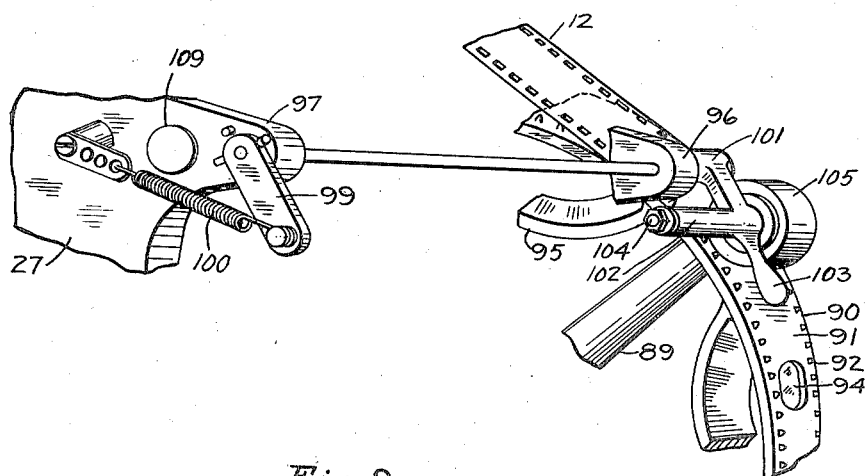
Fig. 8 is a fragmentary perspective detail of the pressure roller mechanism indicated by the arrow 8 in Fig. 3.
Figure 9:
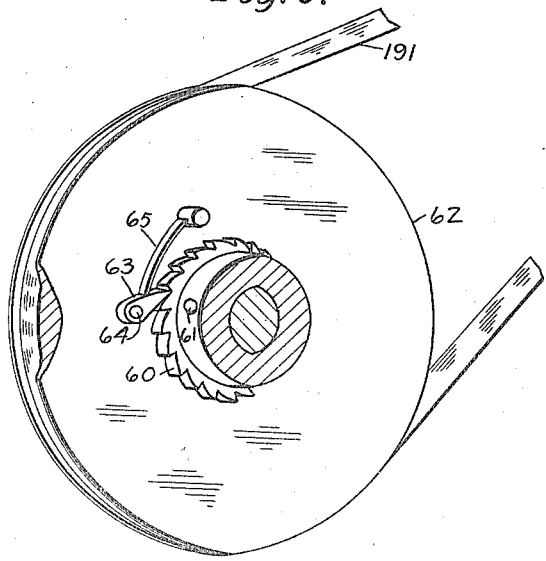
Fig. 9 is a sectional perspective detail on the line 9—9 of Fig. 4 and looking to the left as indicated by the arrow.
Figure 10:
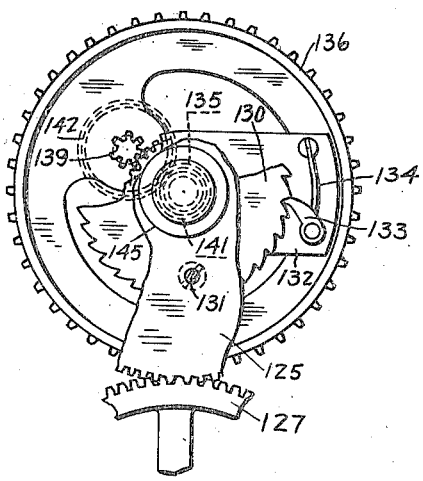
Fig. 10 is a sectional detail substantially on the line 10—10 of Fig. 7, parts being broken away to show other parts.
Figure 11:
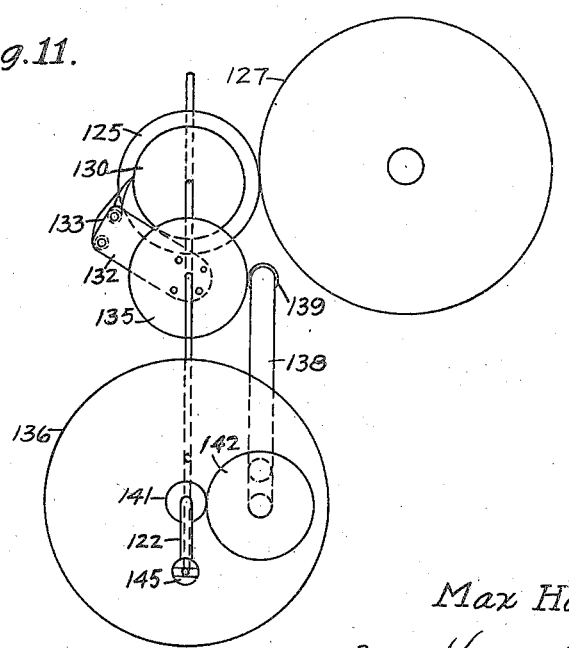
Fig. 11 is a diagrammatic perspective illustrating the film adjusting and registering mechanism.

Referring to Fig. 1, a roll 1' of dye-toned or bleached positive film 1 is mounted upon a stand 2, passed over a guide roller 3 down into a saturating tank 4 and under a guide roller 5 in the tank, then passed up over a guide roller 6, then over a guide roller 7, then over the tension roller 8, over the pressure roller 9 and under the tension guide roller 10, and then to the positive-film adjusting and registering mechanism 11.

A roll 12' of negative film 12 exactly matching the positive film and carrying coloring matter or transfer dye, is mounted upon the arm 13 and passes under the pressure roller 14, around the tension roller 15 to the negative-film adjusting and registering mechanism 16, then to and around the impression mechanism 17, over the timing mechanism 18, under the guide roller 19, over the guide roller 20 to the continuous drier 21, and then to the rewinder 22; the positive film 1 passes from the positive film adjusting and registering mechanism 11 into contact with the negative film 12, around the impression mechanism 17, through the timer 18, under the roller 19, over the roller 20 to the continuous drier 23, and from the drier 23 to the rewinder 24.

The film 1 is a completed perfected dye-toned or bleached positive film such as might be used for projection and it is my object to color this film for the projection of colored pictures. The movement of the film from the stand 2 to the rewinder 22 is steady and comparatively slow. The film 1 passes through a solution in the tank 4, said solution being specially prepared for saturating the film and softening the gelatin so that the gelatin will absorb coloring matter or transfer dye. The negative film 12 is a duplicate of the film from which the positive film 1 was printed, and the positive film 1 will register with the negative film 12.

I prefer to run the negative film 12 around the impression mechanism inside of the positive film 1 for the reason that the positive film 1 has been saturated and softened and will stretch enough to register with the negative film 12 on the curve of the impression mechanism 17. The negative film 12 has been treated so that its gelatin will carry coloring matter or transfer dye, and the films 1 and 12 pass around the impression mechanism face to face, so that the softened gelatin of the positive film 1 will absorb the coloring matter from the negative film 12.

The timing mechanism 18 is adjustable to regulate the time during which the films are in contact, thereby regulating the amount of coloring matter absorbed by the positive film 1. After the films have been threaded through the machine from the stand 2 to the rewinders 22 and 24, the operation may be practically continuous by fastening new films to the ends of the films passing through so that the first films pull the second ones and the second ones the third and so on.

The entire mechanism is geared or belted together and is preferably operated by a motor 25. The motor 25 directly drives the impression mechanism 17 and everything else is driven from this impression mechanism.

The base 26 of the frame is substantially square in plan. The standards 27 and 28 extend upwardly from this base. Bearings 29 and 30 extend inwardly from the standard 27 and the drive shaft 31 is mounted in these bearings. The pinion 32 fixed upon the motor shaft 33 meshes with a larger pinion 34 fixed upon the end of the drive shaft 31. A pinion 35 is loosely mounted upon the drive shaft 31. The clutch 36 extends from the hub of the pinion 35 and has a clutch face 37. The screw 38 inserted through the body of the clutch 36 extends into a groove in the shaft 31, to hold the gear 35 and clutch 36 from moving endwise on the shaft. The movable clutch member 40 is slidingly mounted on the shaft 31 and the pin 42 is fixed in the shaft 31 and slides in a slot 43 in the clutch member 40 to hold the clutch member from rotating on the shaft. The shift bar 44 is slidingly mounted through the arms supporting the bearings 29 and 30 and the fork 45 carried by the shift bar 44 engages in the groove 46 in the clutch member 40 so that by operating the shift bar 44 the clutch member 40 may be moved into and out of engagement with the clutch member 36; said clutch member 40 having a clutch face 47 adapted to interlock with the clutch face 37.

The extension shaft 48 is connected to the shaft 31 by a universal joint coupling 49, said extension shaft 48 being intended to run another machine, and in this manner any desired number of machines may be coupled together to be operated from a single motor, the motor and drive shaft run continuously, each machine being controlled by a shaft bar 44.

A bearing block 50 is connected to the standard 28 by screws 51 and extends inwardly to a point near the center of the base 26. Bearings 52 and 53 are formed in this bearing block, said bearings being in a line parallel with the shaft 31. A worm shaft 54 is mounted in the bearings 52 and 53. A worm 55 is mounted upon the worm shaft 54 between the bearings and a gear 56 is mounted upon the forward end of the shaft 54 in mesh with the pinion 35. An oil pan 57 is mounted between the bearings 52 and 53 below the worm 55.

A main drive shaft 58 is mounted through the standards 27 and 28 and carries a large worm gear 59 in mesh with the worm 55. All the gears from the motor 25 to the drive shaft 58 are arranged to drive the shaft 58 slowly from a comparatively high speed motor.

A ratchet wheel 60 is fixed on the shaft 58 by a pin 61. A grooved pulley 62 is loosely mounted upon the shaft 58 against the ratchet wheel 60. A pawl 63 is pivotally connected to the face of the pulley 62 by a pin 64. A spring 65 presses the pawl 63 against the ratchet wheel 60. A stop plate 66 fits against the end of the shaft 58 and against the end of the hub of the pulley 62 and a screw 67 extends from the center of the plate 66 into the end of the shaft 58, all the parts being fitted so that the pulley 62 will turn freely when not held by the pawl 63 and ratchet 60.

The impression mechanism 17 and the timing mechanism 18 are mounted upon and operated by the shaft 58.

The details of the timing mechanism 18 are as follows:

The segmental toothed plate 68 is mounted against the finished face 69 upon the standard 28 and has teeth 70 upon its periphery. The cap plate 71 is formed integrally with a bearing 72 and the bearing 72 is inserted through the adjusting plate 68 at its axial center. Screws 73 are inserted through the cap plate 71 and through the bearing 72 and tapped into the standard 28, so that the cap plate 71 holds the adjusting plate 68 upon the bearing 72 and against the face 69. A pawl lever 74 has two square teeth 76 to fit the square teeth 70 so as to hold the adjusting plate 68 from rotating in either direction. A handle 77 extends outwardly from the lever 74 for operating the lever to engage or disengage the teeth 76 with the teeth 70. An arm 78 extends from the adjusting plate 68. Studs 79 and 80 are fixed to the arm 78. The negative film feed sprocket 81 is rotatably mounted upon the stud 79 and the positive film feed sprocket 82 is rotatably mounted upon the stud 80, there being grooves around the hubs of the feed sprockets 81 and 82. A third stud 83 extends from the arm 78. A grooved pulley 84 is loosely mounted upon this stud and a coil spring belt 85 extends around the pulley 84 and around the hubs of the sprockets 81 and 82. A pinion 86 is made rigid with the hub of the pulley 84 and meshes with a gear 87 fixed upon a hub 88 and said hub 88 is fixed upon the shaft 58 so that as the shaft 58 rotates, the feed sprockets 81 and 82 are rotated.

The details of the impression mechanism 17 are as follows:

Spokes 89 extend from the hub 88, the gear 87 being bolted to the spokes 89 so as to hold the gear 87 rigid with the hub 88. An impression drum 90 is an annular rim formed integral with the outer ends of the spokes and having a flat peripheral face 91 against which the films bear, there being film sprocket teeth 92 extending from this periphery. Preferably there are six spokes 89. Light openings 93 are formed through the drum 90, said openings being located half way between the ends of the spokes. Transparent glass plates 94 are embedded into the openings 93 from the outside, the outer faces of the glass plates 94 being flush with the face 91, thereby making windows in the drum. Braces 95 connect the outer ends of the spokes 89, said braces being curved inwardly around the light openings.

The negative film 12 comes from above the drum 90 and passes into engagement with the drum 90, fits the face 91 and sprocket teeth 92 and extends around the drum to a point almost directly opposite the point from which it comes to the drum and then leads outwardly from the drum over the feed sprocket 81. The dye-toned or bleached positive film 1 comes against the negative film 12 at the point where the negative film comes against the face of the drum and the positive film fits upon the negative film, the sprocket teeth 92 passing through the positive film as well as through the negative film, and the positive film remains in contact with the negative film slightly more than half way around the drum and then passes out of contact with the negative film and passes over the feed sprocket 82. The point at which the positive film leaves the negative film is accurately adjusted by manipulating the lever 77 to swing the outer end of the arm upwardly or downwardly thereby swinging the feed sprockets 81 and 82 in a line concentric to the shaft 58, and to and from the point at which the positive film and negative film come together so as to increase or decrease the duration of time during which the positive film is in contact with the negative film.

The braces 95 pass inwardly around the windows in the drum so that light may shine freely through the glass plates 94 and outwardly through the films, so that by viewing the films from the outside through the windows the condition of registration between the two films may be readily seen. If necessary or desired artificial light may be supplied to shine outwardly through the windows and through the films.

A bearing 96 extends forwardly from the upper part of the standard 28 and a similar bearing 97 extends forwardly from the standard 27. A rock shaft 98 is mounted in these bearings 96 and 97. A crank arm 99 is fixed upon the rear end of the rock shaft 98 and a spring 100 connects the outer end of the crank arm to the frame. A lever 101 is fixed upon the front end of the rock shaft 98 and extends in the same direction as the crank arm 99. A bearing 102 extends crosswise of the lever 101 and a handle 103 extends forwardly from the lever 101 beyond the bearing 102. A shaft 104 is loosely mounted in the bearing 102. A soft rubber pressure roller 105 is fixed upon the shaft 104 in line to press upon the positive film 1 at a point just beyond where the film 1 comes in contact with the negative film 12; said roller 105 fitting between the two rows of sprockets 92 to press the films firmly upon the sprockets and against the drum. The tension of the spring 100 holds the roller 105 in contact with the film and by operating the handle 103 to raise the roller above the level of the rock shaft 98 the spring will snap the shaft the other way and hold the roller elevated from the drum. The tension of the spring may be increased or decreased to regulate the pressure.

The details of the positive film adjusting and registering mechanism 11 are as follows:

A stub shaft 106 is fixed in the standard 28. A gear 107 is loosely mounted upon the stub shaft 106 and a gear 108 is made rigid with the gear 107 and meshes with the gear 87. A bar 109 is rigidly mounted in the standards 27 and 28 parallel with the main shaft 58, said bar being a piece of shafting mounted in bored holes and held in place by set screws 110. A base 111 is slidingly mounted upon the bar 109 between the standards 27 and 28. An arm 112 extends upwardly from the back end of the base 111. A screw 113 is screw-seated through the upper end of the arm 112, and has a smooth spindle 114 mounted in a bearing 115 in the extreme upper end of the standard 27 there being a shoulder 116 between the screw 113 and the spindle 114 fitting against the inner side of the bearing and a hand nut 117 is mounted upon the outer end of the spindle 114 with its hub fitting against the outer side of the bearing 115, and a pin 118 is inserted through the hub and spindle; so that by manipulating the hand nut 117 the base 111 is moved back and forth on the bar 109. An indicator plate 119 is fixed upon the standard 28 and an indicator 120 is fixed upon the base 111 to move forwardly and backwardly over the plate 119 to accurately show the movement of the base 111. A post 121 extends upwardly from the forward end of the base 111 and a shaft 122 is loosely mounted in a bearing 123 at the upper end of the post 121. A sleeve 124 is pinned upon the rear end of the shaft 122 to fit against the rear end of the bearing 123 and make a stop.

A gear 125 is loosely mounted upon the shaft 122 against the forward end of the bearing 123, the gear 125 having a long face. A pintle 126 is formed by reducing the end of the bar 109. A gear 127 is mounted upon the pintle 126 in mesh with the gear 125 and a gear 128 is made rigid with the gear 127 and meshes with the gear 107. The web of the gear 125 is hollowed out from its front face to produce an annular recess 129. A ratchet toothed rack 130 is fitted into this recess and secured in place by screws 131. A pawl arm 132 has a hub loosely mounted upon the shaft 122 against the hub of the gear 125, and carries a pawl 133 engaging the teeth of the ratchet 130. A spring 134 presses against the pawl 133. A gear 135 is fixed to the hub of the pawl arm 132. A film sprocket wheel 136 is secured upon the shaft 122 against the gear 135 and held in place by a pin 137 so that the sprocket 136 rotates with the shaft 122. A shaft 138 is mounted through the web of the sprocket 136 and a pinion 139 is formed upon the inner end of the shaft 138 in mesh with the gear 135. The forward end of the shaft 122 is reduced to form a pintle 140. A gear 141 is loosely mounted upon this pintle and meshes with a gear 142 fixed upon the front end of the shaft 138. A sleeve 143 extends from the hub of the gear 141. A washer 144 is mounted upon the sleeve against the pinion and a hand nut 145 has a hub mounted upon the sleeve 143 against the washer 144 and secured by a pin so that the pinion 141 is rigid with the hand nut 145. A spring washer 146 is placed against the front face of the hand nut 145 and a cap screw 147 is inserted through the spring washer and tapped into the end of the pintle 140 so that by manipulating the cap screw the tension of the hand nut may be adjusted.

A post 148 extends upwardly from the bearing 123 and has a bearing 149 at its upper end. A stud 150 has a shoulder 151 fitting against the front end of the bearing 149 and a pintle 152 fitting tightly in the bearing 149 and held in place by a set screw 153. A tension sprocket roller 154 is rotatably mounted upon the stud 150 against the shoulder. A fiber washer 155 is placed upon the stud against the front end of the roller 154. A soft rubber pressure regulator 156 is placed upon the stud against the washer 155. A jam nut 157 is screwed upon the stud against the rubber 156. A hand nut 158 is screwed upon the stud against the jam nut 157 so that by manipulating the jam nut 157 and the hand nut 158 to compress or release the rubber 156 the tension or resistance of the roller 154 may be accurately regulated.

A slotted bearing 159 extends upwardly from the bearing 149. A head 160 fits against the front side of the bearing 159 and has a tongue 161 fitting in the slot of the bearing 159 and a screw 162 extending backwardly from the bearing. A hand nut 163 is mounted upon the screw 162 and has a long sleeve extending from its hub against the bearing 159 so that the head 160 may be raised or lowered in the bearing and rigidly clamped in its adjusted position.

A hard rubber pressure roller 164 is loosely mounted upon a pintle 165 extending from the head 160, said roller being grooved to fit the sprocket tension roller 154, in opposition to the film so that the pressure roller 164 will press the film against the sprocket tension roller 154. A post 166 extends upwardly from the bearing 149 in front of the bearing 159 and a bearing 167 is formed at the upper end of this post. A pintle 168 has a head 169 there being a shoulder 170 on one end of the head and a shoulder 171 on the other end of the head; and a second pintle 172 extends into the bearing 167 and is held rigidly in place by a set screw 173. A guide roller 174 is loosely mounted upon the pintle 168 and held in place by a cap screw 175, said guide roller 174 being a spool with flanges on its ends, the flanges being far enough apart to fit a film, said roller being in position to guide the film to the tension sprocket 154.

As the positive film 1 travels over the sprocket 136 the path of travel may be accurately adjusted by manipulating the screw 113. The tension of the film 1 coming to the sprocket 136 is regulated by manipulating the hand nut 158 and the tension of the film 1 going from the sprocket 136 to the drum 90 is regulated by manipulating the hand nut 145. The gear 125 is positively driven from the shaft 58 and the sprocket 136 is driven by the pawl 133 engaging the ratchet 130 and the sprocket 136 is adjusted relative to the gear 125 by manipulating the hand nut 145.

The connection between gear 125 and the sprocket 136 is regulated one way by the tension of the screw 147 upon the spring washer 146, so that if the sprocket has been retarded too much and it is desired to relieve the strain, the screw 147 may be manipulated to loosen the tension.

The details of construction of the negative film adjusting and registering mechanism 16 are identical with the details of the positive film adjusting and registering mechanism 11 just described, so that the negative film 12 is adjusted and registered by manipulating a hand nut 176 to move the path of the negative film 12 back and forth the same as the hand nut 117 moves the positive film 1 back and forth. A hand nut 177 corresponds to the hand nut 158 and a hand nut 178 corresponds to the hand nut 145. An arm 179 extends upwardly from the standard 28 and supports a spindle 180 for receiving the roll 12' of negative film 12.

In starting the machine the drying rack is threaded with old film, then as the old films are drawn through the machine a new negative film 12 prepared with transfer dye may be mounted upon the spindle 180 and the forward end of the new film attached to the tail end of the old film, so that the new negative film 12 will follow the old negative film through the machine and at the same time a new positive film 1 may be placed upon the standard 2, the front end of the new positive film 1 being attached to the tail end of the old positive film, so that the new positive film 1 is drawn through the saturating tank and softened and then drawn through the machine, care being taken to bring the new negative film 12 and the new positive film 1 together upon the drum 90 at the desired point to begin the work of coloring the new positive film 1. During this preliminary operation the adjusting and registering mechanisms 11 and 16 are running loosely until it is desired to start the operation of impressing the transfer dye from the new negative film 12 to the new positive film 1, and then the adjusting operation begins; and this is one of the most vital and important features in producing a good finished exhibition film.

First, the hand nuts 117 and 176 are finely adjusted to make the negative film 12 track properly upon the drum 90 and then make the positive film 1 track properly upon the negative film 12; then the tension upon the films is adjusted by manipulating the hand nuts 158 and 177; then the registration is viewed through the windows in the drum 90 and the hand nuts 145 and 178 are manipulated to retard the films and pull them taut between the adjusting sprockets and the drum 90.

The negative film 12 is dry and firm, as it simply carries transfer dye, while the positive film has been softened in the saturating tank and is more or less yielding or stretchable. As before suggested it is better to run the negative film 12 directly upon the drum 90 and the positive film 1 against the negative film 12. After the negative film has been adjusted to feed to the sprockets of the drum 90 reasonably taut; then the hand nut 145 is manipulated to retard the adjusting sprockets to stretch the positive film 1 to exactly register with the negative film 12; the operation of registration being viewed through the windows of the drum 90. The force of the impression of the positive film 1 against the negative film 12 depends somewhat upon the retarding of the sprockets by the manipulation of the hand nut 145 and the roller 105 serves to work the positive film 1 onto the sprockets of the drum 90 and press it firmly against the negative film and the operation of the feed sprockets 81 and 82 pull the films tightly around the drum 90.

As before suggested the operation is proceeding comparatively slow and the time of the impression is regulated by the manipulation of the handle 77 to move the feed sprockets 81 and 82 to lengthen or shorten the distance through which the impression continues upon the drum 90.

From the feed sprockets 81 and 82 the films 1 and 12 pass under the guide rollers 19 and over the guide rollers 20 to the drier 21 and the drier 23.

The details of the drier 21 are as follows:
The rollers 181 and 182 are mounted parallel one above the other a considerable distance apart and the rollers are of considerable length. The roller 182 has grooves 183 and the spaces 184 between the grooves are substantially equal to the width of the film. A bar 185 is mounted parallel with the roller 182 and has fingers 186 extending into the grooves 183, so that the film will pass between the fingers and the fingers will guide the film.

The film 12 passes over the roller 181 downwardly around and under the roller 182, upwardly between a pair of fingers 186 and so on up and down windingly around the rollers and from the rollers the film finally passes to the rewinding spool 187 driven by a belt 188; said belt connecting a pulley 189 upon the roller 182 and a pulley 190 upon the spindle upon which the spool 187 is mounted. A belt 191 connects the pulley 62 and the pulley 191'. A belt 192 connects the pulley 193 to a pulley 194, said pulley 193 being made fast to be driven from the pulley 191'. A belt 195 connects the pulley 194 to a pulley 196 and a belt 197 connects the pulley 196 to a pulley 198 upon the roller 182; so that as the main shaft 58 operates the drier is operated continuously and the wet films pass slowly over the drier and are thoroughly dried and finally rewound.

The details of the drier 23 are as follows:
The rollers 199 and 200 are mounted parallel. A bar 201 provided with fingers is mounted to coöperate with the roller 200 the same as the bar 185 and the fingers 186 coöperate with the roller 182 and the grooves 183. The pulleys 194 and 196 are fixed upon the rollers 199 and 200 and the film passes over the roller 199 downwardly around the roller 200 and spirally up and down around the rollers and finally to the rewinding mechanism 24.

When the new films pass through the machine, if there are no new films ready, then the old films are connected to the tail ends of the new films and drawn through the machine and left in the machine until new films are ready.

Thus I have produced a machine which will take a prepared positive film; pass it through a saturating tank to soften the gelatin; pass it over a drum and imprint color upon the positive film; and pass the positive film through a drier and rewind the dried printed or colored film upon a spool ready for exhibition.

Various changes may be made in the construction, combination and arrangement of parts without departing from the spirit of my invention as claimed.

I claim:

1. A main drive shaft, an impression drum fixed upon the main drive shaft; a segmental toothed plate rotatably mounted upon the shaft beside the drum; a pawl lever pivotally mounted and having teeth to engage the toothed plate to hold the toothed plate from rotating either way; an arm extending from the toothed plate; studs extending from the arm beyond the periphery of the drum; and film guide means upon the studs.

2. A main drive shaft, an impression drum mounted upon the drive shaft; means for feeding a negative and a positive film to the impression drum; an arm pivotally mounted upon the drive shaft beside the drum; film feed sprockets mounted upon the arm beyond the periphery of the drum; and means for adjusting the arm to move the feed sprockets to and from the point at which the films come to the drum.

3. A main drive shaft, an impression drum mounted upon the drive shaft, said impression drum having a peripheral face for the reception of two films one on top of the other, said impression drum having window openings through the rim from the periphery; and means for feeding two films to the drum one on top of the other so that the registration may be viewed through the windows.

4. An impression drum, means for feeding two films to the impression drum one on top of the other, there being windows through the drum to allow the light to shine through the films to show the registration of one film upon the other.

5. An impression drum rotatably mounted; a square toothed segmental plate rotatably mounted beside the drum; a pawl lever pivotally mounted and having square teeth to fit the toothed plate to hold the plate from rotating either way; an arm extending from the adjusting plate, studs fixed to the arm; feed sprockets upon the studs; and means for driving the feed sprockets.

6. A main drive shaft, an impression drum fixed upon the drive shaft; a square toothed plate mounted upon the drive shaft beside the drum; a square toothed pawl pivotally mounted to hold the plate from rotating either way; a pulley mounted to rotate with the drum; an arm extending from the toothed plate; studs fixed to the arm; film feed sprockets rotatably mounted upon the studs; and a belt extending around the pulley and around the feed sprockets for rotating the feed sprockets.

7. A base, two standards extending upwardly from the base; a main shaft mounted horizontally through the standards; an impression drum mounted upon the main shaft; a rock shaft mounted in the standards parallel with the main shaft; a crank arm fixed upon the rear end of the rock shaft; a spring connecting the outer end of the crank arm to the standards; a lever fixed upon the front end of the rock shaft; a bearing at the outer end of the lever; a shaft loosely mounted in the bearing; and a soft rubber pressure roller fixed upon the shaft and pressing against the periphery of the impression drum.

8. A base, two standards extending upwardly from the base; a main shaft mounted horizontally through the standards; an impression drum mounted upon the main shaft; a rock shaft mounted in the standards parallel with the main shaft; a crank arm fixed upon the rear end of the rock shaft; a spring connecting the outer end of the crank arm to the standards; a lever fixed upon the front end of the rock shaft; a bearing at the outer end of the lever; a shaft loosely mounted in the bearing; a soft rubber pressure roller fixed upon the shaft and pressing against the periphery of the impression drum; and a handle extending from the lever, said lever and handle extending in the same direction as the crank arm, so that by manipulating the handle the roller may be snapped up and down.

9. A supporting bar; a base slidingly mounted upon the bar; an adjusting screw for locating the base upon the bar; an indicator plate rigid with the bar; and an indicator fixed upon the base coöperating with the indicator plate to show the location of the base upon the bar.

10. A supporting bar; a base slidingly mounted upon the supporting bar; a post extending upwardly from the forward end of the base; a shaft loosely mounted in the upper part of the post; an adjusting sprocket mounted upon the shaft; and a screw for locating the base upon the supporting bar.

11. A main drive shaft; a drum mounted upon the drive shaft; a gear carried by the drum; an idler gear in mesh with the drum gear; a shaft loosely mounted; a gear loosely mounted upon the shaft in mesh with the idler gear; a film adjusting sprocket fixed upon the shaft; and an adjustable geared connection between the sprocket and the gear whereby the sprocket may be advanced or retarded relative to the gear.

12. A gear positively driven; an adjusting sprocket mounted on the same shaft as the gear and rotatable in relation to said gear; and an adjustable geared connection between the adjusting sprocket and the gear, so that the sprocket may be advanced or retarded relative to the gear, the sprocket being driven by the gear.

13. A shaft loosely mounted; a gear loosely mounted upon the shaft; an adjusting sprocket fixed upon the shaft; a second gear loosely mounted upon the shaft between the first gear and the sprocket; a pawl and ratchet connection between the first gear and the second gear; a shaft mounted through the web of the sprocket; a pinion upon the rear end of the shaft meshing with the second gear; a third gear upon the other end of the shaft; a hand wheel rotatably mounted upon the shaft; a pinion rigid with the hand wheel meshing with the third gear; and an adjustable friction means for clamping the hand wheel to the shaft, so that by manipulating the hand wheel the sprocket may be advanced or retarded relative to the first gear.

In testimony whereof I have signed my name to this specification.

MAX HANDSCHIEGL.